United States Patent
Zheng et al.

(10) Patent No.: US 8,233,388 B2
(45) Date of Patent: Jul. 31, 2012

(54) SYSTEM AND METHOD FOR CONTROLLING AND TRACKING NETWORK CONTENT FLOW

(75) Inventors: Danyang Raymond Zheng, Fremont, CA (US); Jack C. Cham, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 1065 days.

(21) Appl. No.: 11/444,206

(22) Filed: May 30, 2006

(65) Prior Publication Data

US 2007/0280112 A1 Dec. 6, 2007

(51) Int. Cl.
*H04L 1/00* (2006.01)
*H04L 12/26* (2006.01)
*H04J 1/16* (2006.01)
*H04J 3/14* (2006.01)

(52) U.S. Cl. .................. 370/229; 370/230; 370/230.1; 370/231; 370/232; 370/235; 370/236

(58) Field of Classification Search ............. 370/325, 370/229, 230, 230.1, 231, 232, 235, 236
See application file for complete search history.

(56) References Cited

U.S. PATENT DOCUMENTS

| | | | |
|---|---|---|---|
| 5,566,339 A | 10/1996 | Perholtz et al. | |
| 5,577,209 A * | 11/1996 | Boyle et al. ............... | 726/4 |
| 5,929,855 A | 7/1999 | Benton et al. | |
| 6,088,804 A | 7/2000 | Hill et al. | |
| 6,233,575 B1 | 5/2001 | Agrawal et al. | |
| 6,505,192 B1 | 1/2003 | Godwin et al. | |
| 6,550,012 B1 | 4/2003 | Villa et al. | |
| 6,609,205 B1 | 8/2003 | Bernhard et al. | |
| 6,647,400 B1 | 11/2003 | Moran | |
| 6,717,949 B1 | 4/2004 | Boden et al. | |
| 6,728,885 B1 | 4/2004 | Taylor et al. | |
| 6,735,701 B1 | 5/2004 | Jacobson | |
| 6,795,918 B1 | 9/2004 | Trolan | |
| 6,816,455 B2 | 11/2004 | Goldberg et al. | |
| 6,826,697 B1 | 11/2004 | Moran | |
| 6,829,239 B1 | 12/2004 | Bhatia et al. | |
| 6,883,162 B2 | 4/2005 | Jackson et al. | |
| 6,886,102 B2 | 4/2005 | Lyle | |
| 6,985,920 B2 | 1/2006 | Bhattacharya et al. | |
| 6,993,026 B1 | 1/2006 | Baum et al. | |
| 7,143,442 B2 | 11/2006 | Scarfe et al. | |
| 7,171,689 B2 | 1/2007 | Beavers | |
| 7,246,166 B1 | 7/2007 | Watson | |

(Continued)

OTHER PUBLICATIONS

Stolowitz Ford Cowger LLP, Listing of Related Cases, Nov. 23, 2009.

(Continued)

*Primary Examiner* — Kwang B Yao
*Assistant Examiner* — Adam Duda
(74) *Attorney, Agent, or Firm* — Stolowitz Ford Cowger LLP

(57) ABSTRACT

Systems and methods for controlling the flow of information content in a network are described. The system includes a tracking module that remembers a sensitivity level of the information content and a location of that information content with respect to the system. A marking module is included that receives the sensitivity level from the tracking module upon a call for the information content. The marking module marks a sensitivity tag in a packet header associated with the information content according to the sensitivity level. Flow of the information content in the network is controlled according to the sensitivity tag.

24 Claims, 10 Drawing Sheets

U.S. PATENT DOCUMENTS

| | | | |
|---|---|---|---|
| 7,289,442 B1 | 10/2007 | Srinivasan | |
| 7,299,504 B1 | 11/2007 | Tiller et al. | |
| 7,478,151 B1 | 1/2009 | Maiocco et al. | |
| 2002/0019945 A1 | 2/2002 | Houston et al. | |
| 2002/0053033 A1 | 5/2002 | Cooper et al. | |
| 2002/0065921 A1 | 5/2002 | Davidson et al. | |
| 2002/0091975 A1* | 7/2002 | Redlich et al. | 714/699 |
| 2002/0152185 A1 | 10/2002 | Jamadagni | |
| 2002/0199024 A1 | 12/2002 | Givoly et al. | |
| 2003/0009547 A1 | 1/2003 | Benfield et al. | |
| 2003/0033402 A1 | 2/2003 | Battat et al. | |
| 2003/0084279 A1 | 5/2003 | Campagna | |
| 2003/0093514 A1 | 5/2003 | Valdes et al. | |
| 2003/0120935 A1 | 6/2003 | Teal et al. | |
| 2003/0130967 A1 | 7/2003 | Mannila et al. | |
| 2003/0149727 A1 | 8/2003 | Jaschek et al. | |
| 2003/0165121 A1 | 9/2003 | Leung et al. | |
| 2003/0182580 A1 | 9/2003 | Lee | |
| 2003/0200192 A1 | 10/2003 | Bell et al. | |
| 2003/0200318 A1 | 10/2003 | Chen et al. | |
| 2003/0236995 A1 | 12/2003 | Fretwell | |
| 2004/0049698 A1 | 3/2004 | Ott et al. | |
| 2004/0049699 A1 | 3/2004 | Griffith et al. | |
| 2004/0073800 A1 | 4/2004 | Shah et al. | |
| 2004/0098623 A1 | 5/2004 | Scheidell | |
| 2004/0100976 A1 | 5/2004 | Chang et al. | |
| 2004/0103021 A1 | 5/2004 | Scarfe et al. | |
| 2004/0111637 A1 | 6/2004 | Baffes et al. | |
| 2004/0133672 A1 | 7/2004 | Bhattacharya et al. | |
| 2004/0250112 A1 | 12/2004 | Valente et al. | |
| 2005/0005017 A1 | 1/2005 | Ptacek et al. | |
| 2005/0021740 A1 | 1/2005 | Bar et al. | |
| 2005/0037733 A1 | 2/2005 | Coleman et al. | |
| 2005/0044406 A1 | 2/2005 | Stute | |
| 2005/0060562 A1 | 3/2005 | Bhattacharya et al. | |
| 2005/0063377 A1 | 3/2005 | Bryant et al. | |
| 2005/0251861 A1 | 11/2005 | Cunningham et al. | |
| 2006/0089985 A1 | 4/2006 | Poletto | |
| 2006/0218640 A1 | 9/2006 | Lotem et al. | |
| 2006/0242694 A1 | 10/2006 | Gold et al. | |
| 2007/0086336 A1 | 4/2007 | Richards et al. | |
| 2007/0086480 A1 | 4/2007 | Elzur | |
| 2007/0220061 A1 | 9/2007 | Tirosh et al. | |
| 2008/0046572 A1 | 2/2008 | Jagels | |

OTHER PUBLICATIONS

Van Vleck, "How the Air Force Cracked Multics Security", May 21, 1993, http://www.multicians.org/security.html.

ITC Institute, "Computer Associates Inc.", Apr. 14, 2005, http://www.itcinstitute.com/solutionsMarket/company.aspx?cid=20.

AXS-One, "Products: Award-Winning Technology", Jan. 21, 2006, http://www.axsone.com/products_technology.shtml.

Pohs et al., "The Lotus Knowledge Discovery System: Tools and experiences", Nov. 21, 2001, http://www.research.ibm.com/journal/sj/404/pohs.html.

Rekhter et al., "Cisco Systems' Tag Switching Architecture Overview (RFC 2105)", Feb. 1997, 13 pgs.

Fox et al., "NHRP Support for Virtual Private Networks (RFC 2735)", Dec. 1999, 12 pgs.

Farinacci et al., "Generic Routing Encapsulation (GRE) (RFC 2784)", Mar. 2000, 9 pgs.

Yener et al., "A Formal Method for Attach Modeling and Detection", Computer Science Department, Rensselaer Polytechnic Institute, Jun. 2001, 17 pages.

International Searching Authority, "Notification of Transmittal of the International Search Report and the Written Opinion of the International Searching Authority, or the Declaration," PCT/US04/29185, mailed on Dec. 26, 2005, 8 pages.

Current Claims, PCT/US04/29185, 8 pages.

Verwoerd, T. and Hunt, R., Security Architecture Testing using IDS—A Case Study, Computer Communications, Elsevier, U.K., vol. 25, No. 15, Sep. 2002, pp. 1402-1412.

Verwoerd, T. and Hunt, R., Intrusion Detection Techniques and Approaches, Computer Communications, Elsevier, U.K., vol. 25, No. 15, Sep. 2002, pp. 1356-1365.

Helmer, Guy G. et al., "Intelligent Agents for Intrusion Detection", Iowa State University, Ames Iowa 50011, 4 pages.

Ning, Peng et al., "Abstraction-Based Intrusion Detection in Distributed Environments," 2001, ACM Transactions on Information and System Security (TISSEC), vol. 4, Issue 4, pp. 407-452.

Microsoft Corporation, "Smart Tag Installation and Security for Microsoft Office XP", Oct. 2001, Microsoft Corporation, http://msdn.microsoft.com/en-us/library/aa163610(office.10, printer).aspx, 10 pages.

Microsoft Corporation, "Search Inbox Data Using Smart Tags in Word 2003", Sep. 2004, Microsoft Corporation, http://msdn.microsoft.com/en-us/library/bb226685(office.11,printer).aspx, 15 pages.

* cited by examiner

SYSTEM AND METHOD FOR CONTROLLING AND TRACKING NETWORK CONTENT FLOW

TECHNOLOGY

The present invention relates to the field of networking. More particularly, embodiments of the present invention relate to systems and methods for controlling and tracking network content flow.

BACKGROUND

With the widespread use and growth of networking with computers and communication systems, diverse issues relating to privacy, data security, fiduciary and other concerns have led to the establishment of various laws, rules, regulations, standards for various industries. Encouraging and enforcing compliance with these requirements has become a significant endeavor. Compliance networking has thus become a lively, well established field. Compliance Networking generally refers to methods implemented or action taken at the network to help ensure compliance with the aforementioned laws, rules, regulations, standards, etc.

For instance, confidentiality is an important, perhaps crucial concern to medical patients and social services clients. Thus, health care and social related entities such as commercial, non-profit and governmental hospitals, clinics, professional offices, pharmacies, welfare offices, etc. now typically operate with strict compliance standards in place to protect their patients' and clients' privacy interests. Special attention has been given for networks to assist in meeting such compliance standards.

Similarly, commercial businesses and financial institutions such as banks, credit unions, government revenue offices, etc. now typically operate with strict compliance standards in place to protect their own and their clients' privacy and financial interests. Further, technical, legal, military and other entities now typically operate with strict compliance standards in place to protect the security of their data, code, etc. As these examples illustrate, regulatory compliance has become a significant issue across a broad spectrum of modern activities. In as much as networks have become nearly ubiquitous, compliance networking has also become important in various industries.

Driven by standards and associated regulations, compliance networking equipment (hereinafter compliance equipment) is being used increasingly in an attempt to detect leakage of sensitive information. Just in the examples above for instance, numerous kinds of information are monitored for including intellectual property (IP) such as source codes, designs, confidential information such as patient records, social security, credit card and bank account numbers and classified military data among others. Compliance equipment is useful in monitoring for improper information transmittals as well, such as may include improperly accessed IP (e.g., software, music and movie downloads, etc.), objectionable matter (e.g., racist material, pornography, gambling, etc.), spam and other improper email and the like.

Compliance equipment typically monitors information traffic at gateway network access devices such as routers and switches that reside near the edge of a network. In this conventional configuration, the compliance equipment thus monitors traffic flowing out to and in from the Internet or another network. Compliance equipment thus detects information leakage in outgoing network traffic and records and reports its source, e.g., the source of the information leakage.

In monitoring the traffic, the compliance equipment examines the constituent packets of the traffic and effectively tries to reconstruct what that traffic comprises. In some instances (e.g., installations, situations, configurations, etc.), compliance equipment may effectively perform this function passively, e.g., without necessarily stopping or significantly impeding the information flow. For example, while the compliance equipment may record and report the leakage source, it does not necessarily stop the information from flowing out to the Internet or elsewhere.

However, in other instances, compliance equipment may intercept and capture information traffic deemed to violate a compliance standard. Thus, compliance equipment may actively deter release of violative or other non-compliant traffic. For example, in addition to recording and reporting a leakage source, compliance equipment can actively deter release of non-compliant traffic, e.g., effectively impeding or blocking the traffic from flowing out to and/or in from the network.

Compliance equipment is typically placed either in series with network information traffic, such as between two routers, switches, etc., or in an effectively off-line, tap and/or substantially parallel configuration relative thereto wherein it essentially taps the network traffic to listen thereto (e.g., snoop on, eavesdrop upon, etc.). A variety of kinds of compliance are currently used, each approaching compliance networking issues from a unique perspective and performing a specialized, distinguishable (e.g., differentiable) function related thereto.

Compliance equipment includes three kinds of surveillant systems: detection only devices, forensic devices and prevention devices. Detection only devices examine virtually all network traffic flowing through a gateway and record policy violations that they observe, typically in real time. Forensic devices endeavor to capture everything passing through, typically for off line (e.g., other than real time) scrutiny. Prevention devices block the flow of traffic that violates a compliance policy that they have been programmed to enforce.

While their perspectives and functions may vary, all three kinds of compliance equipment share some commonalities. For instance, each kind (e.g., type) of device is positioned effectively at the edge of a network, such as a business entity's or government agency's firewall, a department's or command's edge router, etc. Typically, the compliance device is practically (e.g., physically) located proximate to premises (e.g., offices, facilities, etc.) of an entity's information technology (IT) or like department. So deployed however, the compliance device is accessible (e.g., internally) to the people therein. This internal exposure can itself pose issues relating to compliance networking, such as where a compliance policy forbids IT personnel from having such proximity and access, e.g., to confidential personal information not releasable outside of a human resources or legal department.

The various types of compliance equipment also all take in virtually all of the traffic that passes through the gateway device, firewall, etc. with which it is associated. Thus to effectively monitor this traffic, their networking interfaces must match the peak bandwidth of the gateway's or firewall's flow through. High traffic volumes can thus raise issues relating to scalability, for instance where compliance equipment is used for surveilling a very large and/or active network.

Currently available compliance equipment has typical traffic handling capacities on the order of 100-400 megabytes. However, large modern corporate, financial, government, academic, scientific and other networks may reach peak traffic levels on the order of gigabits. To effectively handle such high gateway bandwidths, efficiency in performing compliance related processing and other functions can be a significant factor. Efficiency can be especially significant where an active, high bandwidth gateway is monitored with relatively modest compliance equipment.

To achieve performance efficiency, compliance equipment is typically programmed to classify network traffic and to handle its various classifications according to some discriminating scheme. A filtering process can focus the efficient use of compliance equipment bandwidth and processing resources. Thus, certain kinds of traffic are effectively ignored and heightened scrutiny is applied, e.g., in some efficient (e.g., controllable, reserved, economical, etc.) fashion, to other particular kinds. Filter devices used with compliance equipment are typically programmed to function according to a one or more of several parameters.

For instance, filtering may be performed on the basis of protocol, size and/or destination related information such as Internet Protocol (IP) addresses. Thus, traffic conforming to a certain programmed protocol, such as Simple Mail Transfer Protocol (SMTP), or traffic of a certain size characteristic, such as all files below one kilobyte (1 kB), is ignored. Similarly, traffic addressed to a particular range or list of IP subnets, addresses, etc., such as those associated with a competitor, a foreign entity, a suspect designation or destination, etc. is examined more closely.

Given the breadth of the spectrum of modern activities illustrated by the examples above and the sheer volume of network traffic, the number of classifications with which network traffic may be classified is large. However, the wide variety of information that may be "interesting," e.g., worthy of compliance based scrutiny is also large. Conventional compliance equipment can optimally scan a large volume of various types of traffic, but may then be constrained to detect (e.g., denote for scrutiny, etc.) a relatively few kinds of information. Conversely, conventional compliance equipment can optimally detect a larger variety of information types, but may then be constrained by the volume and varying types of traffic.

This dichotomy in optimizing compliance based traffic surveillance reflects a granularity issue with which conventional compliance surveillance must contend. To program compliance equipment on the basis of a large number of classifications could be a dauntingly complicated proposition, such as where traffic volumes are great. Typically, the parameters by which filtering is performed are few. However, such coarse granularity can unfortunately result in somewhat inflexible compliance equipment functionality in some instances.

To provide breadth and depth of coverage and some flexibility in the types of documents and other information, conventional compliance networking equipment typically relies on examination of content of network traffic based on keywords, regular expressions, phrases, terms, syntax and/or semantics. While syntactic/semantic detection based compliance networking equipment can achieve remarkable breadth and depth of coverage, they may be prone to false positive detections.

False positives can occur because syntactic/semantic detection is based on parameter sets such as some number of keywords, regular expressions, binary signatures and the like. Cutting the number of false positives for higher accuracy results can be achieved by increasing the number of detection factors. However, increasing the number of detection factors can be computationally costly (e.g., CPU processing, memory usage, etc.). With large amounts of information such as an enterprise's document repositories, such computational costs can be significant.

Syntactic/semantic detection is performed at the application layer. To provide protection to a document, conventional equipment scans the document to detect syntactically and/or semantically interesting parameters therein. The document is reassembled and analyzed on the fly, e.g., as it is being sent as an email attachment. In order to detect content, all of the packets of the traffic are collected and the session effectively reassembled. The content is then reconstructed and decoded to understand context. The computational cost required to achieve this, e.g., with large traffic volume, is significant. In addition to the computational costs, where large amounts of information are to be protected, this can be inefficient and hinder traffic flow.

DETAILED DESCRIPTION

Figure 1:
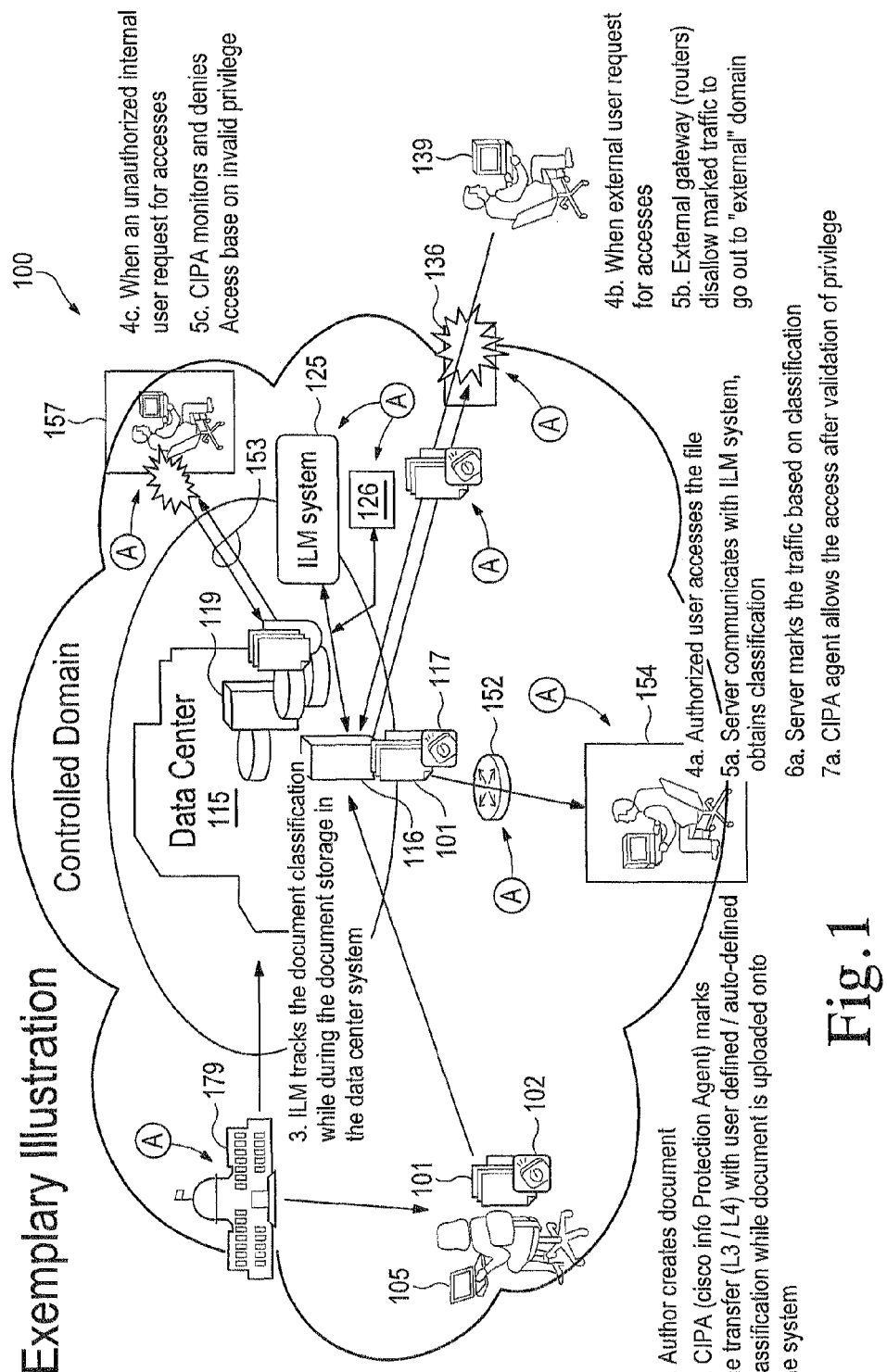
FIG. 1 depicts an exemplary controlled domain with which an embodiment of the present invention may operate.

Exemplary embodiments of methods and systems for tracking and controlling network content flow are described below. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, methods, systems, processes, procedures, components, circuits and apparatus, protocols, standards, etc. have not been described in detail so as not to unnecessarily obscure aspects of the present invention.

Portions of the detailed description that follows are presented and discussed in terms of processes. Although blocks and sequencing thereof are disclosed in a flowchart figure herein (e.g., FIGS. 2 & 7) describing the operations of this process, (e.g., processes 20 & 70, respectively), such blocks and sequencing are exemplary. Embodiments of the present invention are well suited to performing various other blocks or variations of the blocks recited in the flowchart of the figure herein, and in a sequence, order, etc. other than that depicted and described herein, unless and except as described herein otherwise.

In one embodiment, a process for tracking and controlling network content flow is performed with a computer based system. Means for performing such a process include (but are not limited to), in various embodiments, a variety of computer and networking systems, devices, apparatus and communication media, including but not limited to routers, network switches, firewalls, gateways, content and other servers, and network access control devices, including software, hardware, firmware and/or combinations thereof. In one embodiment, such a process is performed with a computer under the control of computer readable code. In one embodiment, the computer readable code that is encoded upon (e.g., within) a computer readable medium. In one embodiment, such a process includes a method for managing a network. The phrases "document" and "file" are used herein to exemplify any assemblage of data or other information.

Embodiments of the present invention relate to methods and systems for tracking and controlling network content flow. In one embodiment, a system includes a tracking module that remembers a sensitivity level of the information content and a location of that information content with respect to the system. A marking module is included that receives the sensitivity level from the tracking module upon a call for the information content. The marking module marks a sensitivity tag in a packet header associated with the information content according to the sensitivity level. Flow of the information content in the network is controlled according to the sensitivity tag.

One embodiment protects sensitive documents from leaking out of a network improperly. In one embodiment, information that relates to the sensitivity of a document is abstracted. The abstracted sensitivity information is placed in a lower layer in the International Standards Organization's (ISO) Open System Interconnect (OSI) network protocol stacks. Embodiments of the present invention tag the abstracted sensitivity information in the network and transport layers. Tagging this information in the network and transport layers allows its detection with network infrastructure. Further, network equipment (e.g., routers, switches, and end point devices such as client computers) can take action, based on the tag, to deter or prevent leakage. Embodiments of the present invention comprise a network information protection framework. The network is used to consolidate policy and detection schemas to control the movement and use of compliance interesting information within an entity and to/from external interfaces.

Therefore, embodiments of the present invention leverage existing network resources to protect sensitive information from leakage. Embodiments of the present invention thus allow an improvement in efficiency and scalability over convention compliance networking solutions. Content based syntactic/semantic detection performed at the application layer is obviated, along with its need to collect all of the packets of the compliance interesting document traffic, reassemble the session, and decode and analyze detected documents on the fly. Embodiments of the present invention thus mitigate the computational demands that can characterize conventional compliance networking solutions. Further, in leveraging network resources to protect large amounts of information, embodiments of the present invention function without the deterrence or delay in traffic that can characterize conventional compliance networking solutions.

Classification

In one embodiment, sensitivity information (e.g., information that relates to the sensitivity of a document) is abstracted. The abstracted sensitivity information is placed in the network and/or transport layers (e.g., L3/L4) in the OSI network protocol stacks. One embodiment protects the document through the network in three stages. The stages correspond with the usage cycle of a sensitive document: creation, storage and use (e.g., consumption). FIG. 1 depicts an exemplary controlled domain 100 with which an embodiment of the present invention may operate.

Creation

Documents have two sources, as used herein. Documents can be created by an author or a document may already exist, e.g., as legacy documents, in a file system, as existing data in a database, etc. Once created, documents are classified, e.g., identified and sorted. Documents that are deemed to be sensitive are accorded protection. Embodiments of the present invention classify documents by tagging on a marking at L3/L4 of the packet header when the document is uploaded, e.g., to a repository through Network 100. Identification of sensitive documents early in their existence Embodiments of the present invention can perform the classification function in more than one place and/or time. For instance, an author creates a document 101 on a client computer 105. Client 105 has a client agent 102 associated therewith. In one embodiment, client agent 102 comprises a software module running on client 105. While authors can manually classify their documents, client agent 102 functions to discover (e.g., detect and understand) the sensitivity of documents created with client 105. Client agent 102 functions to automatically discover the sensitivity associated with a document as the author creates it on client 105. Further, in one embodiment client agent 102 employs a crawling functionality to automatically search through previously created but as yet unclassified documents that may already exist. These documents are stored locally with client 105. Upon discovering sensitivity therein, client agent 102 classifies the existing documents as needed.

Storage

Sensitive document 101 arrives at document repository 116 upon uploading. The document arrives classified with the L3/L4 tags in the packet headers associated therewith. Upon its arrival, the network layer headers are stripped therefrom. From his point on, the server 116 that stores the content takes on a function of remembering (e.g., storing, etc.) the sensitivity with an association made with its L3/4 marking during the time the document stays in the system. In one embodiment, the sensitivity information that is extracted when the L3/4 tags are processed is associated with the stored document, e.g., with its representative metadata.

In one embodiment, the mechanism of remembering, storing, etc. a document's associated sensitivity is performed with Information Life Cycle Management (ILM) system 125. Meta data for each of the files associated with documents in controlled domain 100 are kept in ILM system 125. In another embodiment, a dedicated system 126 is tasked with storing (e.g., remembering) the sensitivity of the document using stored meta data associated therewith.

Classification is not limited to the client side. In one embodiment, a software agent 117 is associated with document repository (e.g., server) 116 in data center 115. In one embodiment server agent 117 employs a crawling functionality to automatically search through previously created but as yet unclassified documents that may already exist in repository 116. These documents are stored locally with server 116 and/or in data storage 119. Upon discovering sensitivity therein, discovery agent 117 classifies the existing documents as needed. Discovery agent 117 walks through the files structure (e.g. directories) and classifies each file. The classification information is then placed within the ILM system 125 and/or dedicated classification memorizing system 126.

The respective discovery functions performed with client agent 102 and discovery agent 117 can be performed and/or supported with somewhat different discovery software modules. Thus, embodiments of the present invention are well suited to accommodate what may be significant differences in the relative computational capabilities of clients and servers. In one embodiment for instance, a significant characteristic in the design of client agent 102 is that its function does not slow, impede, interfere with, or otherwise adversely impact a user's operations with client 105. In one embodiment, crawling and pattern search monitor programs associated with the function of client agent 102 run in the background. Execution thereof can be manually started, paused, etc. and/or scheduled to run at predetermined times, such as during predictably extended periods of relative disuse of client 105, etc.

Consumption

This stage represents users accessing sensitive file, such as a user other than the author accessing document 101. Server 116 associates the meta data corresponding to the document, remembers the association such as with a mapping between the particular metadata and the remembered classification. Server 116 then appends (e.g., tags on) an appropriate L3/4 marking to each packet the document is carried on. The L3/4 tag appended to the packets by server 116 will typically be the same classification marking with which the document is tagged upon creation or discovery by client agent 102 and/or discovery agent 117. Upon re-tagging the document, the server is ready to forward the document to a requesting user. The flow of the classified documents is controlled based on the classification.

Figure 2:
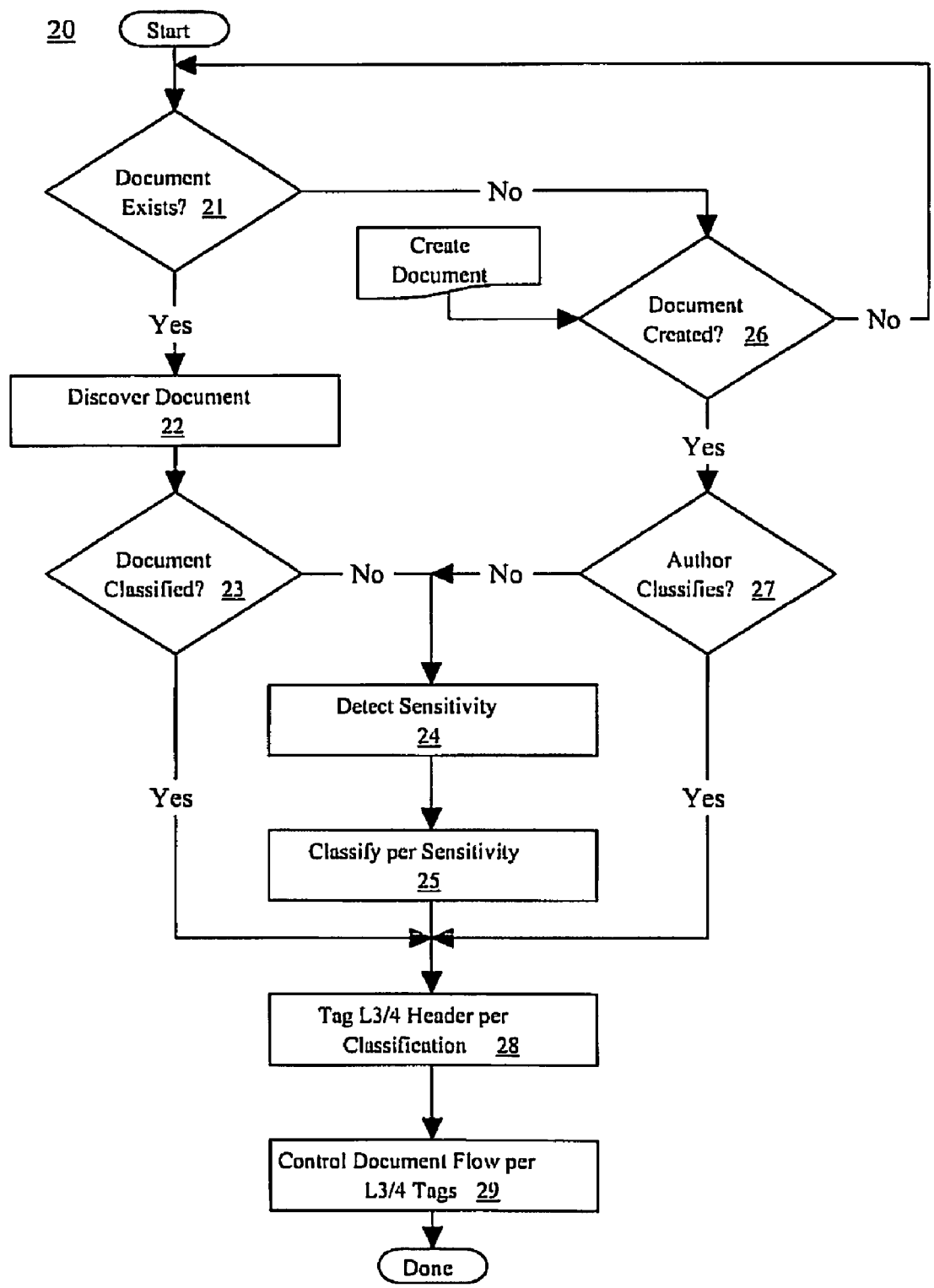
FIG. 2 depicts a flowchart of an exemplary process for classifying documents, according to an embodiment of the present invention.

Within controlled domain 100, documents are thus classified in one of several ways. FIG. 2 depicts a flowchart of an exemplary process 200 for classifying documents, according to an embodiment of the present invention.

Exemplary Process for Classification

Process 20 begins with block 21 wherein it is determined whether a document exists. If so, in block 22, the document is discovered, such as with a crawling client agent and/or a server discovery agent. In block 23, it is determined whether the discovered document is classified. If not, in block 24 the sensitivity of a document is detected. Upon detecting sensitivity in a document, in block 25 the document is classified per (e.g., according to) the detected sensitivity.

Where no document is determined to exist, in block 26, it is determined whether a document is created. If so, upon its creation, it is determined in block 27 whether the document's author classifies the document, e.g., manually with a user interface. If the author does not classify the document, the sensitivity of the document is detected in block 24.

In block 28, an L3/4 packet header associated with the document is tagged in accordance with the sensitivity classification. In block 29, subsequent flow of the document through the network is controlled according to the L3/4 sensitivity classification tags, completing process 20.

Control: Tracking, Marking and Enforcement

The flow of the classified documents is controlled based on the classification and the requester's identity, location, etc. Flow control may vary in view of a classified document's intended flow destination. With reference again to FIG. 1 for instance, where the destination 139 of traffic bearing a classified document is external to the network comprising controlled domain 100, it may be desirable to prevent the sensitive information therein from reaching that destination. Thus in one embodiment, a network access control device (NACD) 136 such as a router, switch, gateway, firewall or the like at the periphery of network 100 will act based on the classifying L3/4 header tags to prevent egress of the document and onto the Internet, the World Wide Web (WWW; sometimes in these and similar contexts referred to as the "Wild, Wild West"), etc.

Traffic flowing through the controlled domain 100 to a user internal thereto is handled in the present embodiment somewhat differently. In this instance, a client agent 102 associated with the user examines the L3/4 header classification tags of the traffic packets. Based on the classification evinced by the L3/4 tags and a classification access level for which the user is authorized, the client agent makes a determination as to whether or not that particular user may access the sensitive document.

If the user is authorized to access documents tagged according to that level of sensitivity classification, the document is allowed to flow through to that user. However, if that user is not authorized to access that level of classified document, the client agent causes the traffic to that user to be dropped and logs the incident, such as for administrative, forensic or other purposes. Where traffic flow is allowed to an authorized user, further monitoring can be performed. For instance, the authorized user's file system, clipboards and the like can be monitored by he client agent to prevent or deter leakage of sensitive information via email, drives or the like.

Tracking

After documents containing sensitive information are identified and classified, embodiments of the present invention than act to protect the sensitive information. In one embodiment, a software entity that resides on clients and within a device of the central repository functions as a tracking module. Client agent 102 can fulfill this function for client computer 105. For server 116, this function can be performed with discovery agent 117 or another module. For server 116, the function can also be performed with a module associated with ILM system 125. Server 116 stores the content and remembers its sensitivity with an association to its L3/4 marking during the time the content stays in the system. In one embodiment, the sensitivity information that is extracted when the L3/4 tags are processed is associated with the stored document, e.g., with its representative metadata.

Exemplary System

Figure 3:
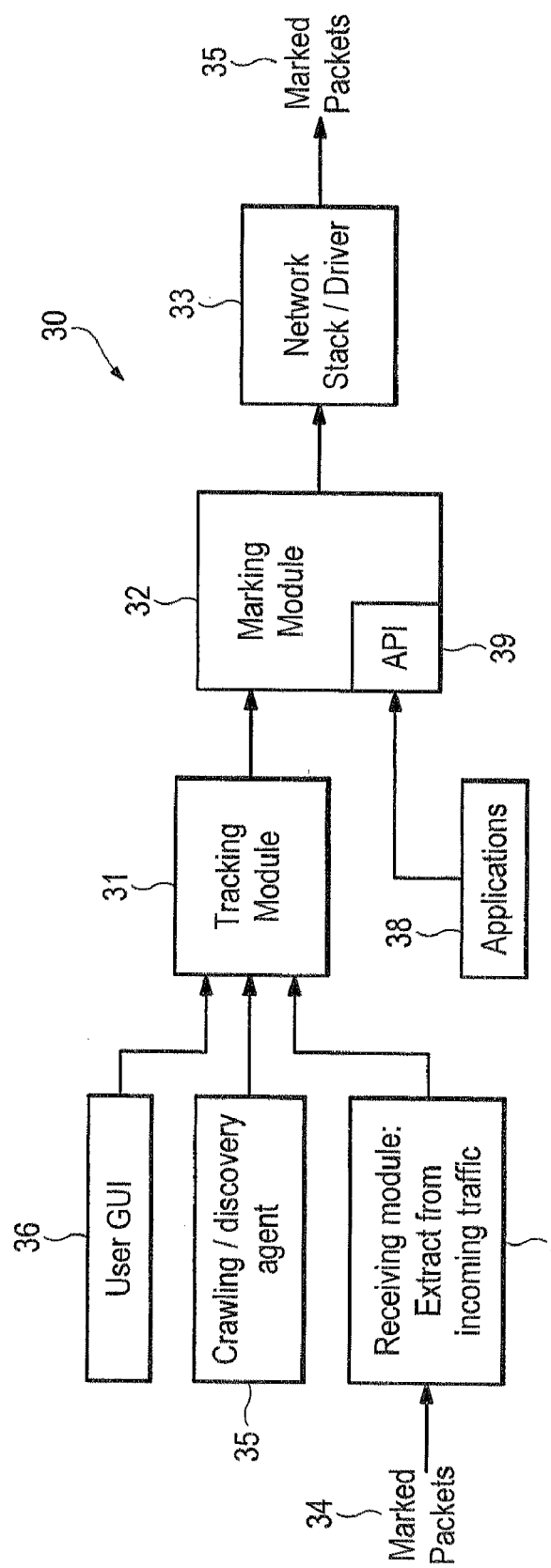
FIG. 3 depicts an exemplary system for tracking and controlling network content flow, according to an embodiment of the present invention.

FIG. 3 depicts an exemplary system 30 for controlling and tracking network content flow, according to an embodiment of the present invention. A tracking module 31 is deployed with the client side and the server side. Tracking module 31 keeps a record of where the protected documents (e.g., files) are. Where the files are moved, copied, or subjected to some similar change, tracking module 31 records where the protected files and derivatives thereof end up.

In one embodiment, the function of tracking module 31 is a static one. The tracking module 31 tracks the file statically on the basis of a user input with graphical user interface (GUI) 36 or that of the discovery agent 35. Further, tracking module 31 functions dynamically to "understand" the movement of files, parts thereof, etc. The understanding of tracking module 31 is described in relation to the following examples.

An exemplary file 'A' is a protected file containing sensitive information. (1) When file 'A' is copied to a second exemplary file 'B', the sensitive information is assumed to follow therewith, such that both files 'A' and 'B' now contain the sensitive information. (2) When a user copies a part of file 'A' and pastes it into a clipboard, a scratchpad or the like, and subsequently pastes the copied part of file 'A' from the clipboard/scratchpad into file 'B', file 'B' similarly "inherits" the sensitivity of file 'A'. In both examples, both files 'A' and 'B' now require the protection that was appropriate for file 'A'. Tracking module 31 thus functions to ensure that, upon copying file 'A' to file 'B', both files 'A' and 'B' are accorded protection commensurate with the sensitivity of the information therein.

In one embodiment, a function of tracking module 31 is implemented with a security agent such as a Cisco Security Agent™ (CSA™), a software product of Cisco Systems, Inc., a corporation in San Jose, Calif. Advantageously, this implementation allows the present embodiment to leverage existing technology.

Tracking module 31 acquires initial tracking targets from any of three sources deployed on the client side, the server side (e.g., within central repository 115; FIG. 1) or both. One client side source is a user input that is made, in the present embodiment, with GUI 36 or another user interface. Another source is input from a crawling and/or discovery agent 35, which may be deployed on the client side, the server side, or both.

Tracking module 31 can also acquire tracking targets with a receiving module 37. Receiving module 37 extracts a marking (e.g., an L3/4 packet header tag) from incoming marked network traffic packets 34 that designates which of packets 34 comprise sensitive information. The marking thus designates packets that are marked therewith as tracking targets. Receiving module 37 can function on the client side, as when files are downloaded thereto. Receiving module 37 can also function on the server repository side, as when files are uploaded thereto from a client computer.

Documents with sensitive may be stored or generated at any of several places in a network. When uploading a sensitive document to a repository, appropriate L3/4 header tags are appended thereto. Network storage entities function to store the content of these documents without the headers, which are removed with receiving module 37. In one embodiment, the L3/4 headers are processed and sensitivity information extracted therefrom. The sensitive document storage remembers (e.g., tracks) the documents' sensitivity with an association made with the extracted sensitivity information. The extracted sensitivity information from the processed L3/4 markings remains associated document during the time the document stays in the system. In one embodiment, tracking is performed with tracking module 31.

In one embodiment, tracking module 31 is disposed with or functions with an ILM functionality. Meta data for each of the files associated with sensitive documents are kept in an ILM system or a dedicated similarly functional system. When sensitive documents are retrieved from storage, tracking module 31 apprises (e.g., informs) a marking module 32 of their sensitivity. Marking module 32 appends L3/4 tags, appropriate to the documents' sensitivity, to headers of packets that will contain the document or parts thereof as they traverse the network.

Marking

In one embodiment, a marking module 32 is disposed or functional with the client side as well as the server side. Thus as client applications 38 create or use sensitive documents, marking module 32 functions to add the L3/4 tags to the headers of packets that will transport the sensitive documents from the client.

In one embodiment, marking module 32 functions to transfer the knowledge of a document's sensitivity and attributes thereof down to the networking and transport layers (layers 3 and/or 4 in the OSI model). Marking module 32 monitors what goes out of a network interface and applies the appropriate L3/4 header tags to the packets associated with a protected file. Information regarding what files are sensitive and thus, which files are to receive the header tags is obtained from tracking module 31. Also provided therefrom is information regarding the appropriate attributes of the tags that are to be appended to the headers.

Marking module 32 can couple and work with applications 38 to identify sensitive documents for tagging and to decide what tags to append to their headers. In one embodiment, an application program interface (API) 39 informs one or more of applications 38 to add the L3/4 markings (e.g., tags) directly. For instance, API 39 informs application 38 to add the L3/4 tags directly to the document's headers when the application 38 calls the network driver code. In another embodiment, marking module 32 calls the network stack/driver 33. Embodiments of the present invention are well suited to either implementation and in fact, to implementations having other characteristics.

Conventionally, an application would typically call a network stack/driver routine to packetize a file, prior to its being sent to the network. In some embodiments of the present invention, an alternative approach is utilized. In one exemplary implementation for instance, the marking module 32 effectively intercepts application calls that would conventionally go to the network/stack driver 33 and places sensitivity indicative L3/4 tag markings in a file's packet headers. In one embodiment, marking module 32 performs these functions as a virtual network interface.

To perform its tagging function, marking module 32 relies on input from tracking module 31. The input of tracking module 31 relates to the sensitivity of a document and thus allows marking module 32 to determine "when" and "what" to tag on to the packet headers. In one embodiment, tracking module 31 extracts sensitivity information and transfers it to an ILM or similar system. Marking module 32 retrieves the sensitivity information from the ILM system when a file or copy thereof is retrieved from storage Upon marking the packets, the documents associated therewith may be released to the network, where they are subjected to rigorous protective action by network entities. Network devices protect sensitive information packets according to the L3/4 sensitivity data encoded into their headers.

Enforcement with Network Equipment

Embodiments of the present invention advantageously leverage existing network resources, devices like NACDs, routers, switches, gateways, firewalls, access points and the like, to protect documents, files, etc. that bear sensitive information. Packets associated with sensitive documents and files are deterred by these network devices from leaving the premises of the network. With reference again to FIG. 1 for instance, the controlled domain 100 may comprise a network internal to an enterprise or other entity such as an intranet. Based on the L3/4 tags with which its packet headers are marked, NACD 136 stops the egress of sensitive document 101 from the intranet 100. Thus, migration of the sensitive document 101 to the internet or elsewhere external to intranet 100 is deterred.

Further, devices such as routers and switches that are internal to the network allow or disallow access within the network based on the L3/4 header tags. Thus, downloading of sensitive document 101 by authorized client 154 is permitted by internal router 152. However, downloading of sensitive document 101 by an unauthorized client 157 is prevented by internal router 153, as are unauthorized uploads therefrom to repository 115. In one embodiment, enforcement with network devices such as routing, switching, blocking and the like, using network/transport layer filtering based on the L3/4 header tags is performed with methods that are well known in the field. Enforcement is thus performed in real time by existing network resources and with computational demands that are limited to the processing of the Layer 3 optional header information and/or the layer 3 port numbers and can be handled with existing IPS/IDS service blades in routers. Embodiments of the present invention thus benefit from economy and scalability.

Figure 4:
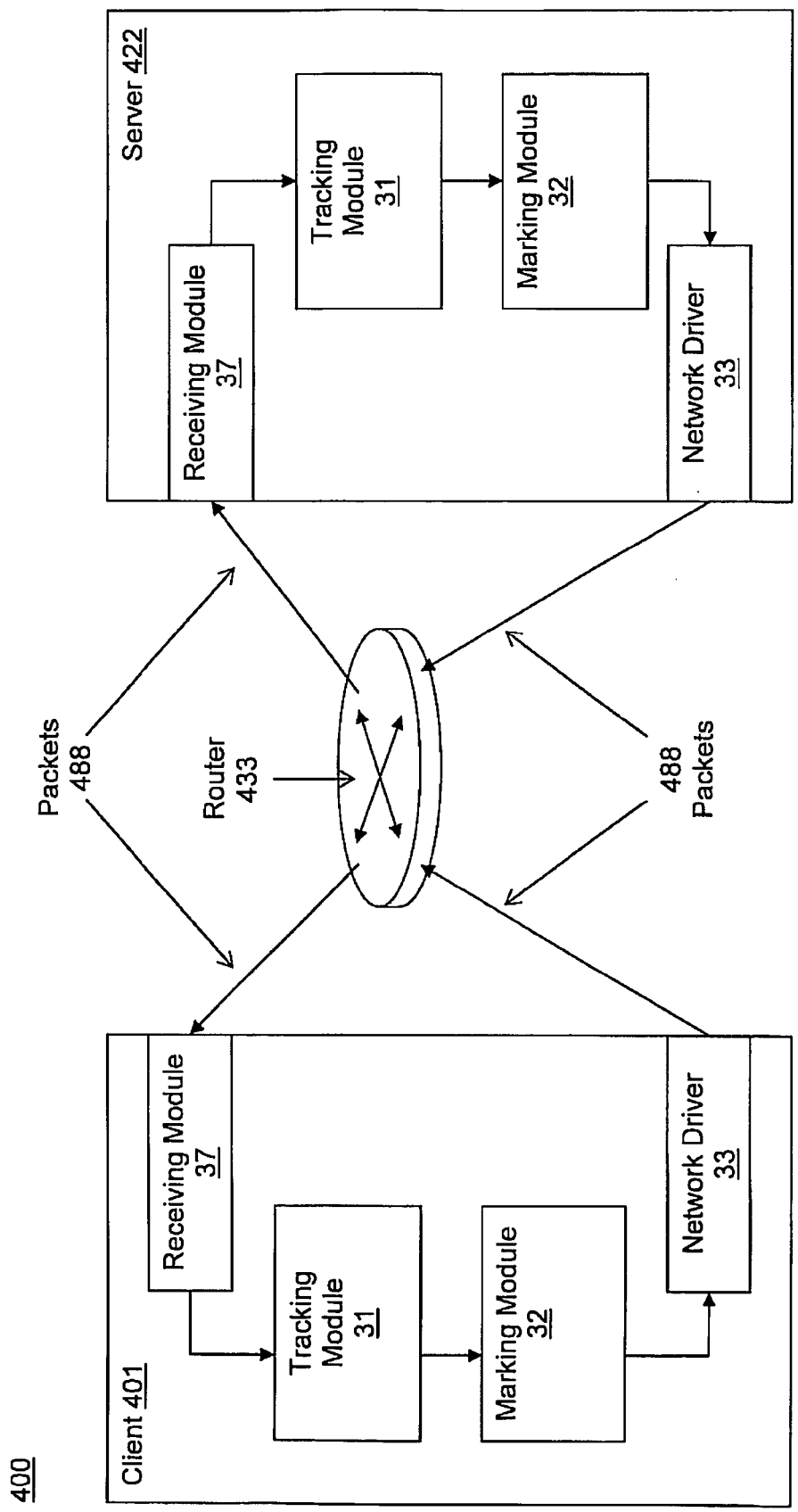
FIG. 4 depicts exemplary networked client and server based implementations of systems for controlling and tracking network content flow, according to an embodiment of the present invention.

FIG. 4 depicts exemplary networked client and server based implementations 400 of systems for controlling and tracking network content flow, according to an embodiment of the present invention. Client 401 is coupled via router 433 with server 422. Client 401 and server 422 exchange packets 488 between their respective network drivers 33 and receiving modules 37 through the router 433. Within client 401 and server 422, the receiving modules 37 remove headers from packets 488 before sending their content to tracking module 31, which remembers their sensitivity. Prior to sending sensitive packets from their network drivers 33, marking module 32 tags their headers with an L3/4 sensitive marking.

In one embodiment, the tracking modules 31, the marking module 32 and the receiving module 37 and network driver 33 comprise the client agent for client 401. Receiving module 37 controls incoming sensitive traffic and informs tracking module 31 when a sensitive file is allowed to be downloaded. Further, with reference again to FIG. 3, a GUI 36 allows authors to classify their documents and a crawling agent/discovery module 35 allows sensitive documents to be located automatically.

Tracking module 31 keeps track of protected files and enforces protection locally at the client by restricting certain file movements such as printing, copying to portable drives and other portable storage media, etc. Marking module 32 injects sensitivity information into L3/4 headers.

In one embodiment, server 422 comprises an application server. In one embodiment, the application server has a dedicated, specialized and/or unique function. In another embodiment, the application server comprises a supplemental functionality associated with or added to existing or legacy servers. Exemplary application servers in various embodiments include file servers, web servers and database servers. Common functions performed with servers in various embodiments include reception of marked traffic with receiving module 37, tracking the classification of documents with tracking module 31, and upon retrieving a classified document, obtaining its classification again from tracking module 31 and tagging packets accordingly, performed with marking module 32. In one embodiment, an ILM system is used with tracking module 31.

Exemplary Data Structure

Figure 5:
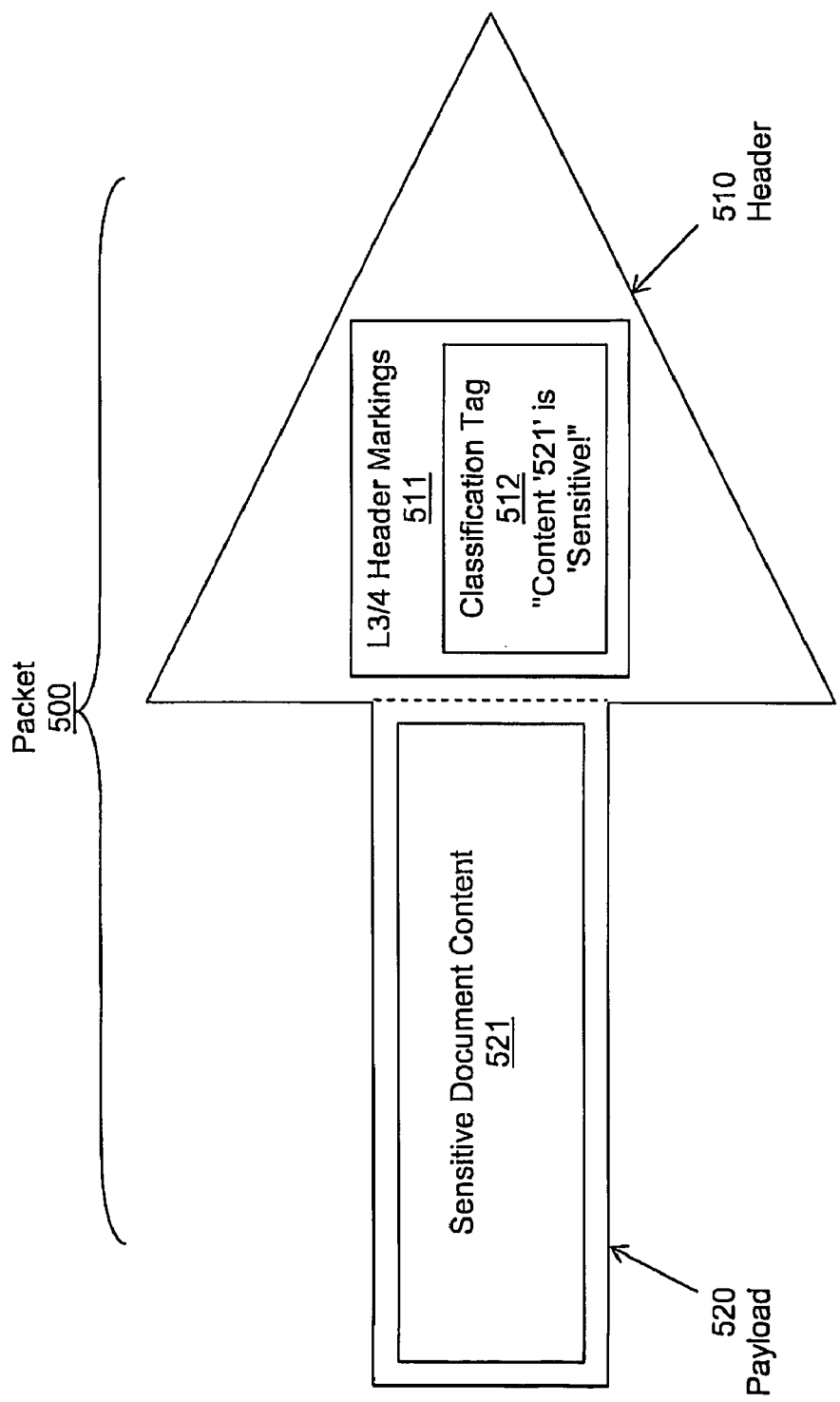
FIG. 5 depicts an exemplary data structure, according to an embodiment of the present invention.

FIG. 5 depicts an exemplary data structure 500, according to an embodiment of the present invention. In one embodiment, data structure 500 comprises a packet for transmitting information through a network. In one embodiment, packet 500 comprises code that is substantially compliant with one or more communication protocols that can include (but are not limited to) Transmission Control Protocol/Internet Protocol (TCP/IP), File Transfer Protocol (FTP), Wireless Access Protocol (WAP). Packet 500 comprises information in a form that can be exchanged within a network, such as between client 401 and server 422 and with network devices such as router 433 (FIG. 4). Packet 500 comprises a data structure that has an information payload 520 and a packet header 510. The information of payload 520 can comprise sensitive content 521, which can be a document, file, etc.

Packet header 510 is appended to payload 520 to configure packet 500 for network communication (e.g., transmission, routing and switching, reception, etc.). Packet header 510 thus comprises data that is used by network devices to route and switch packet 500 within the network from its source to its destination. The data in packet header 510 may designate an external destination, such as another network, the internet, etc.

Routing, switching and other networking functions are performed on packet 500 according to header markings 511, to which network devices are intelligently responsive. Header markings 511 thus work at the OSI network and transport layers 3 and 4. In an embodiment of the present invention, where document content 521 is identified as having sensitive information, the L3/4 header markings 511 include a classification tag 512.

The classification tag 512 evokes an exemplary packet sensitivity warning that effectively states:

"Content '521' is sensitive!"

and that allows the sensitivity warning to be understood by devices sensitive to L3/4 layer data. Classification tag 512 thus denotes to networking equipment, at the L3/4 layers to which they are intelligently responsive, that the packet 500 contains sensitive information and is to be handled (e.g., routed, switched, blocked, etc.) accordingly. Networking devices may thus protect the sensitive document content 521.

In one embodiment, the ability of classification tag 512 to inform as to the sensitivity of packet 500 includes the flexibility to connote both a level of relative sensitivity of content 521 and the type of sensitive information that content 521 comprises. The types of sensitive information may vary. Examples include information relating to engineering and design, financial and business, personnel and personal, etc. and thus respectively relate to different user groups, including: engineering and technical, accounting and managerial, and human resources and individuals.

Exemplary Protective Networking Action

Figure 6:
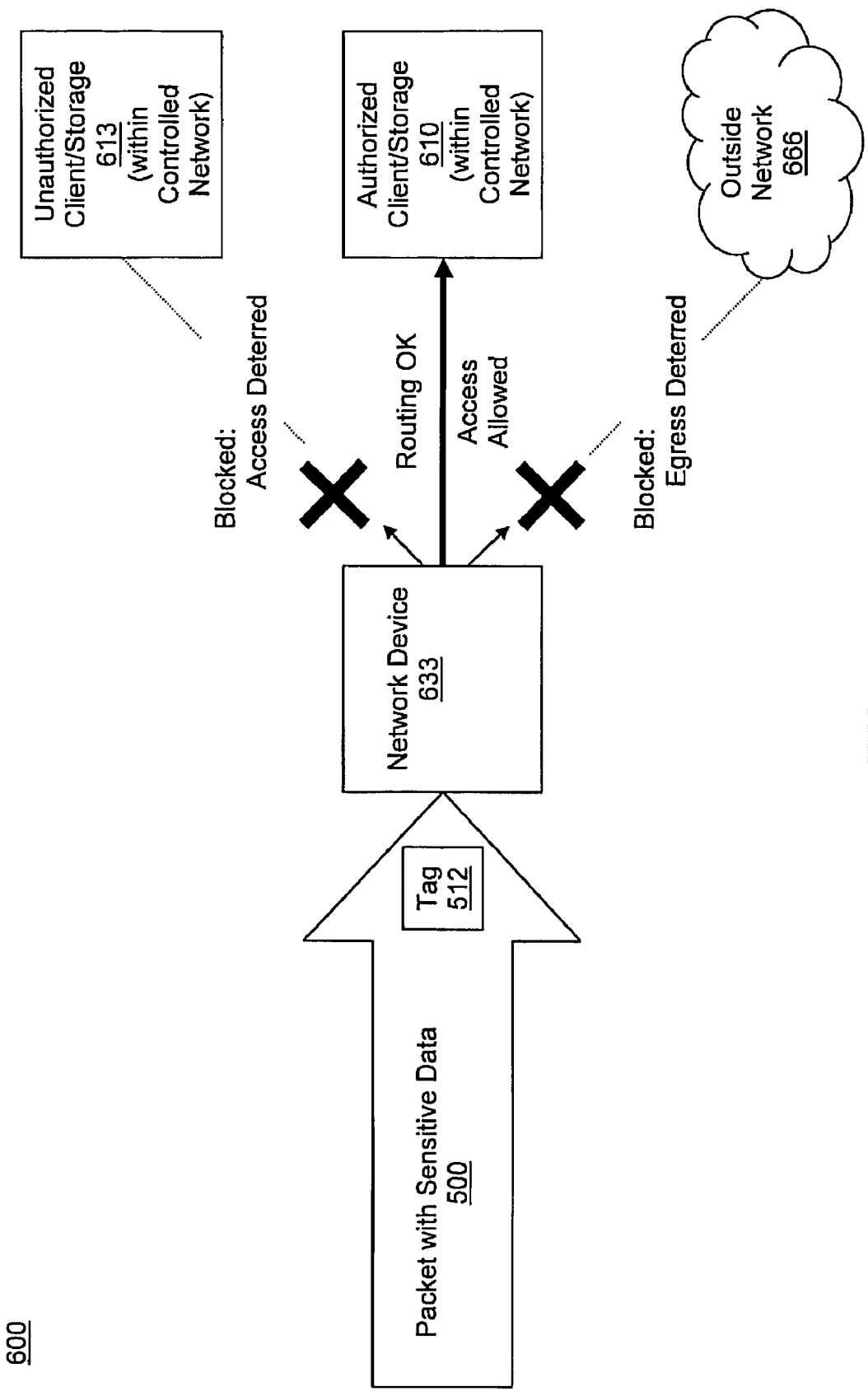
FIG. 6 depicts exemplary networking actions based on an encoded tag in a data structure, according to an embodiment of the present invention.

FIG. 6 depicts exemplary networking actions based on an encoded tag in a data structure, according to an embodiment of the present invention. Packet 500 contains sensitive information that needs protection, as denoted with L3/4 classification tag 512. As packet 500 is propagated through the network, it encounters network device 633. Network device 633 can be a NACD such as edge router 136 (FIG. 1) or an internal router between that couples clients and servers in a controlled intranet (e.g., router 433; FIG. 4). Network device 633 is intelligently responsive to L3/4 tag 512 and thus understands that packet 500 contains sensitive information that is to be protected.

Network device 633 protects the sensitive information in packet 500 by handling the packet in accordance with the L3/4 tag 512. Thus, where an authorized client 610 within the controlled network attempts to access packet 500, the routing transaction is approved in accordance with the L3/4 tag 512. With this approval, authorized client 610 is allowed to download packet 500. Where an unauthorized client or storage element 613 within the controlled network attempts to access packet 500 however, the routing transaction is not approved. The router 633 understands from the L3/4 tag 512 that unauthorized client/storage 613 is not permitted to access packet 500. The router 633 takes appropriate action to deter unauthorized access to the packet 500 and thus blocks it from being downloaded by client/storage 613.

Where the network device 633 is disposed at the edge of a controlled network, it may function as a NACD and control traffic between the controlled network and an outside network 666 such as the internet. To protect sensitive information therein, access to packet 500 from outside and the egress of packet 500 from the controlled network is to be prevented. Thus where unauthorized network 666 attempts to access (or an internal entity attempts to export) packet 500, the routing transaction is not approved. The router 633 understands from the L3/4 tag 512 that egress of packet 500 from the controlled network is not permitted. The router 633 takes appropriate action to deter unauthorized egress of the packet 500 and thus blocks its export to the external network 666.

Enforcement with Client Computers

While embodiments of the present invention effectively utilize network resources to protect sensitive documents, client computers are also used in one embodiment to provide further protection. With reference again to FIG. 4, in one embodiment, receiving module 37 comprises software that is disposed (e.g., deployed, used) with a client computer 401. When sensitivity marked packets are downloaded from the network and arrive on client 401, the client's receiving module 37 reads their L3/4 sensitivity tags. The receiving module 37 checks to ensure that the client 401 is authorized, e.g., that its user has the proper permission to receive such traffic.

In one embodiment, the client receiving module 37 checks its user's identity, user groups and the like. This identity related information is compared with the L3/4 sensitivity markings to determine whether client 401 is authorized to access sensitivity marked packets. Where the user identity data matches the classification data denoted in the L3/4 markings, client 401 is allowed to access (e.g., download) the packets. However, if it is determined that the user is not authorized to access the packets, receiving module 37 blocks the file or other content from being imported and from being stored locally to client 401.

Where client 401 is allowed to access a sensitive file, receiving module 37 adds a new entry corresponding to the sensitive file to the tracking module 31. Tracking module 31 then places the sensitive files under surveillance. Tracking module 31 then tracks the movement of sensitive files while they reside at client 401. For instance, tracking module 31 stays aware of renaming, copying and other use and alterations of sensitive files. Further, tracking module deters the egress of sensitive information by preventing their export over unauthorized channels. For instance, tracking module 31 prevents sensitive files from being printed and/or copied to a mobile (e.g., portable) storage device such as a universal serial bus (USB) coupled flash or other removable drive, disk, etc.

Embodiments of the present invention may also be used with legacy and other client computers that may lack protective agents and/or the ability to program and/or deploy one thereon. This can be achieved with the implementation of an encryption scheme and/or a network access control (NAC) protocol. The encryption scheme would function to ensure that the sensitive payloads of sensitivity marked packets are protected and that only machines (e.g., other clients, servers, storage, etc.) that do have adequate protection agents installed and functional are able to decrypt and decode the sensitive content. With a NAC protocol, only client machines with protection agents installed are allowed access to the controlled intranet. One such NAC protocol with which an embodiment of the present invention can work is the Cisco NAC Protocol™, which is promulgated by Cisco Systems, Inc.

Management and Policy

With reference again to FIG. 1, an administrative server (e.g., "an administrator") 179 provides a management system to distribute policies to clients. The policies relate to the classification, marking, tracking and enforcement functionalities discussed above. The classification policy relates to the action of classification. For instance, to simplify client interaction, the administrator 179 can pre-define a set of default classifications for a group of users. Administrator 179 can also define patterns for a discovery module to search for, as where an automatic sensitivity discovery policy is used with client agent 102, discovery agent 117 and crawling/discovery agent 35 (FIG. 3).

One exemplary pattern for discovery module search that can be set can include finding all documents that bear phrases like "Confidential," "Company Confidential," and/or military/government classification levels such as "Secret," "Top Secret," "Restricted Data," "NOFORN" (e.g., "Not Releasable to Foreign Nationals"), the British "Most Secret" and the like. Another exemplary search pattern can include looking for any file that has C-language characteristics (or e.g., those of another computer language with which source code may be generated) AND (e.g., a logic joinder with) the phrase "Company Confidential" or the like.

Advantageously, another exemplary search pattern can economize search resources with an ability to define directories that the discovery agent can "skip." For example, there is probably little value to be gained in the protection of sensitive information in general to have the discovery agent search system directories; thus these directories are defined to not be searched.

In one embodiment, the policy for marking deals with defining the format of the header to define how it denotes sensitivity. With reference again to FIG. 3, the marking policy thus controls how the marking module 32 correctly marks (e.g., tags, flags, sets, scribes, etc.) appropriate bits and/or how receiving module 37 interprets those bits.

The policy for enforcement defines the privileges appropriate for clients, individual and group users, and the types and classifications of documents that can be accessed at various levels (e.g., read, read-only, modify, read/modify, etc.). For example, consider a user with a position within an entity's structure, hierarchy, etc. wherein they function as an engineering director. A typically appropriate enforcement policy may be unicast to that user, which specifies that they may read highly secret engineering documents, source code, critical path schedules and the like. However, the policy would forbid that particular user from accessing sensitive company financial documents (other than perhaps an engineering department budget), private human resources data (other than perhaps partial data regarding an employee working directly under their management) and the like. The enforcement policy further defines how users may change sensitive documents, such as whether or not particular users may print sensitive files, copy sensitive files to portable storage media, and/or rename files.

In one embodiment, centralized management for clients causes them to log relevant sensitivity related activities as necessary. Moreover, such activities are reportable to administrative server 179 or another centralized authority source, which can then coordinate or provide corrective, prophylactic, forensic or other remediation, as needed. In one embodiment, centralized management also applies at the network level. For instance, administrative server 179 (or other centralized management authority) informs routers and switches what level of access to grant to particular clients or classes of clients, nodes and the like to various kinds of sensitive data according to the data's L3/4 sensitivity tag. At the boundaries of a controlled network, NACDs, gateways, firewalls, edge routers, etc. are informed as to what L3/4 tags indicate traffic whose egress from the control network is forbidden or to be otherwise deterred.

Exemplary Process for Tracking and Controlling Network Content Flow

Figure 7:
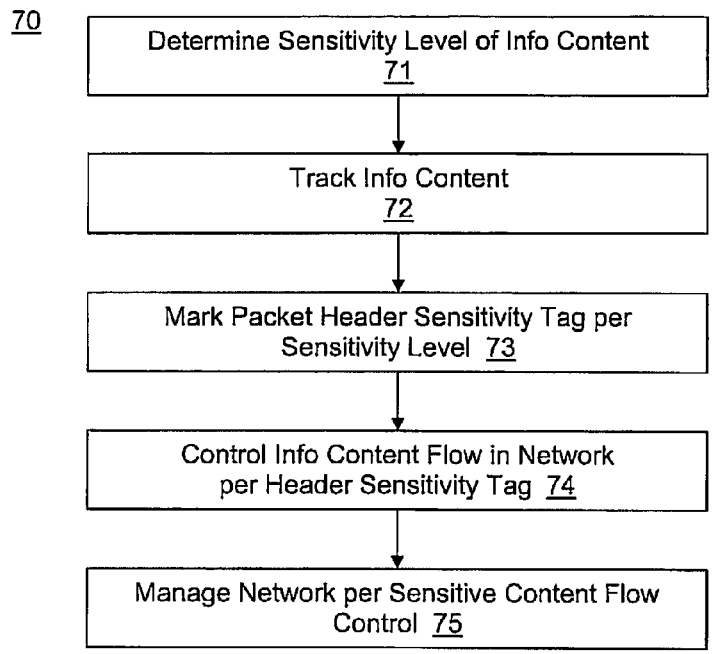
FIG. 7 depicts a flowchart of an exemplary process for tracking and controlling network content flow, according to an embodiment of the present invention.

FIG. 7 depicts a flowchart of an exemplary process 70 for tracking and controlling network content flow, according to an embodiment of the present invention. Process 70 begins with block 71, wherein the sensitivity level of information content is determined. In block 72, the information content is tracked. Tracking is performed in one embodiment with reference to FIG. 8, below. In block 73, packet headers of packets associated with the information content, formed for instance upon calling for the content, are tagged according to the sensitivity level. In block 74, the flow of the information content through the network is controlled according to the sensitivity tags in its associated packet headers.

Figure 8:
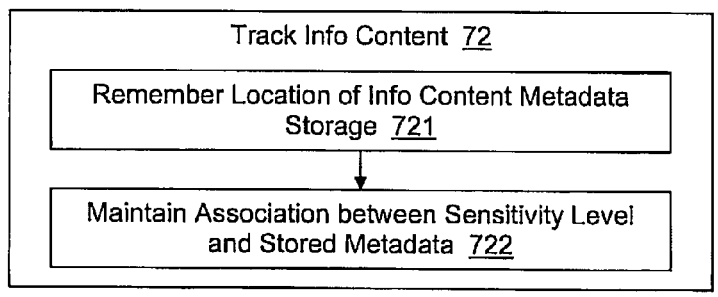
FIG. 8 depicts a flowchart of an exemplary process for tracking information content, according to an embodiment of the present invention.

FIG. 8 depicts a flowchart of an exemplary process 72 for tracking information content, according to an embodiment of the present invention. Process 72 begins with block 711, wherein the location of information content (e.g., metadata corresponding thereto) is remembered. In block 722, an association is maintained between the sensitivity level and the stored information (e.g., metadata corresponding thereto).

Figure 9:
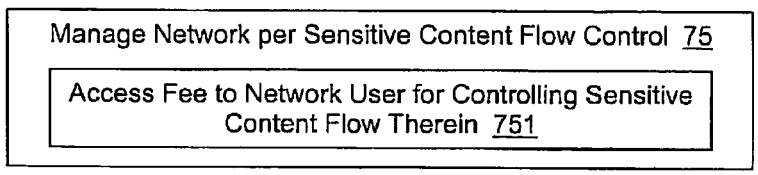
FIG. 9 depicts an exemplary implementation of a business method for managing a network, according to an embodiment of the present invention.

In one embodiment, process 70 also comprises a method for managing a network. Thus, in optional block 75, the network is managed according to the control of sensitive content flow therein. FIG. 9 depicts an exemplary implementation of managing a network according to the control of sensitive information content wherein, in block 751, a fee is assessed to a network user in exchange for controlling the flow of sensitive information content therein.

Figure 10:
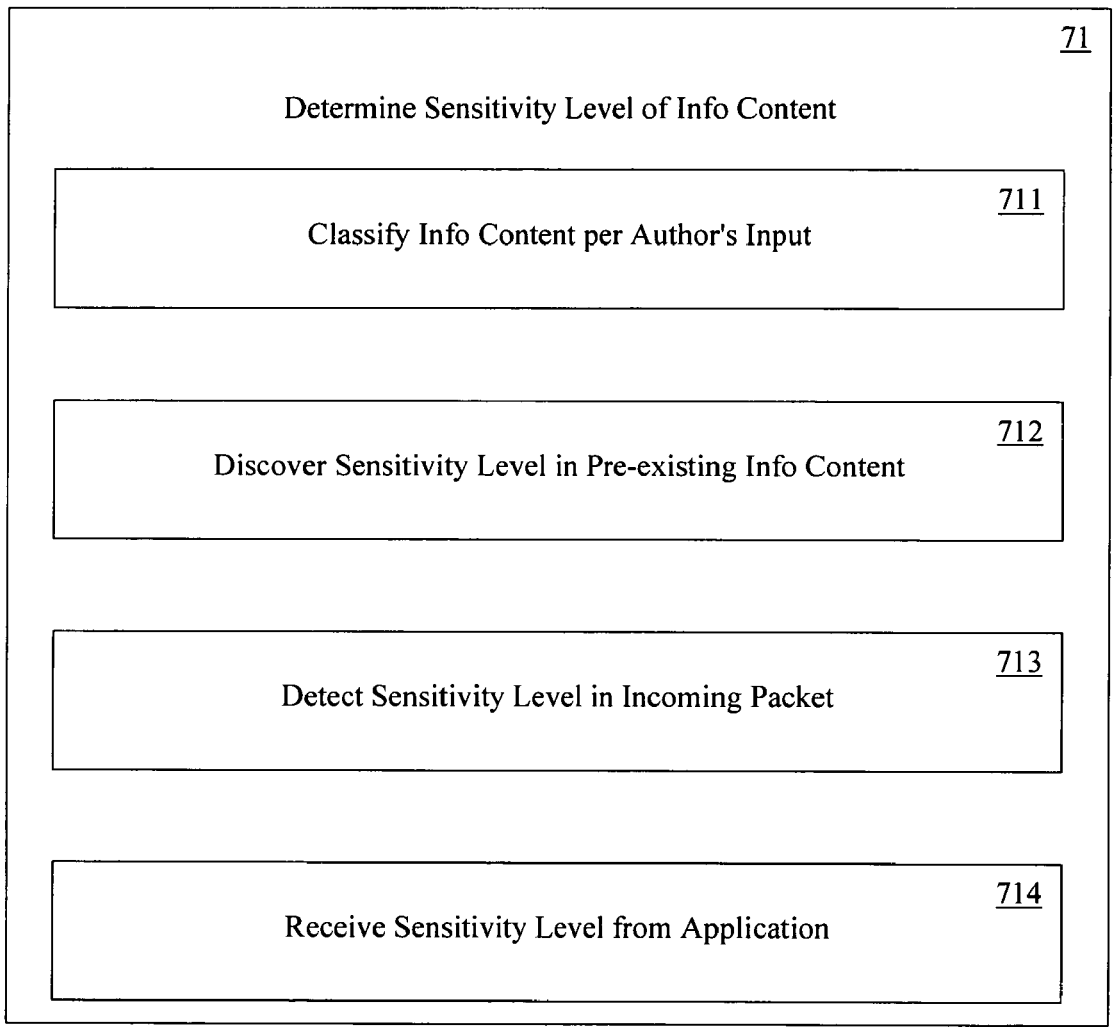
FIG. 10 depicts an exemplary implementation wherein the sensitivity of information content is determined, according to an embodiment of the present invention.

FIG. 10 depicts an exemplary implementation wherein the sensitivity of information content is determined (e.g., block 71, above) according to an embodiment of the present invention. Determining the sensitivity of information content as in block 71 above comprises at least one of the following. In block 711, information content is classified according to the input of its author. In block 712, the sensitivity associated with pre-existing information content within a system (e.g., stored therein) is discovered. In block 713, a sensitivity level is detected in incoming packets of information. Blocks 712 and 713 are discussed below with respective reference to FIGS. 11 and 12. In block 714, a sensitivity level is received from an application.

Figure 11:
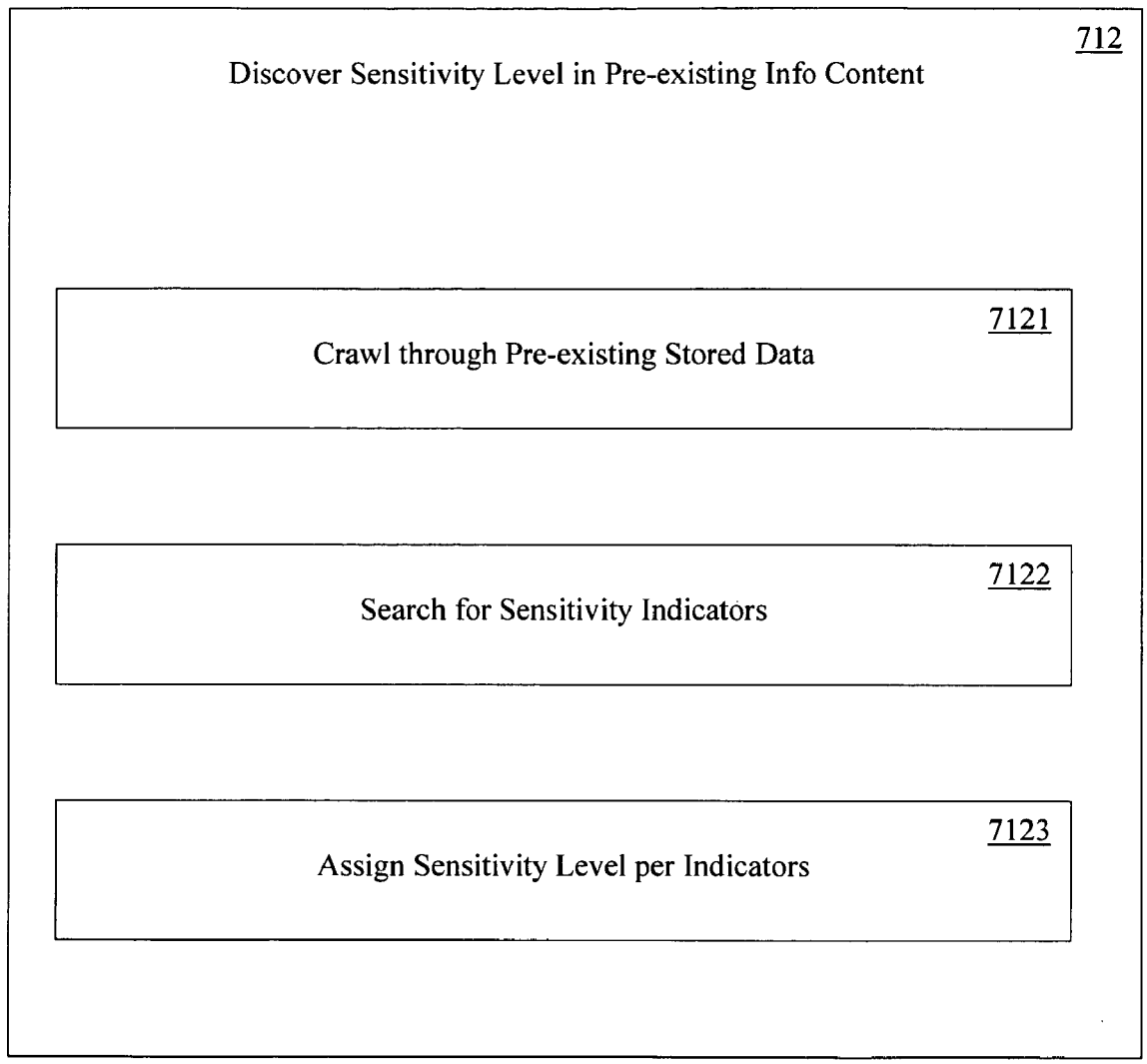
FIG. 11 depicts a flowchart of an exemplary process for discovering the sensitivity of pre-existing information content, according to an embodiment of the present invention.

FIG. 11 depicts a flowchart of an exemplary process for discovering the sensitivity of pre-existing information content (e.g., block 712, above), according to an embodiment of the present invention. In block 7121, a discovery agent crawls through pre-existing data in storage. In block 7122, indicators of sensitivity are searched for among the pre-existing data. Where such indicators are found, in block 7123, a sensitivity level is assigned to the pre-existing data according to the indicators that are found.

Figure 12:
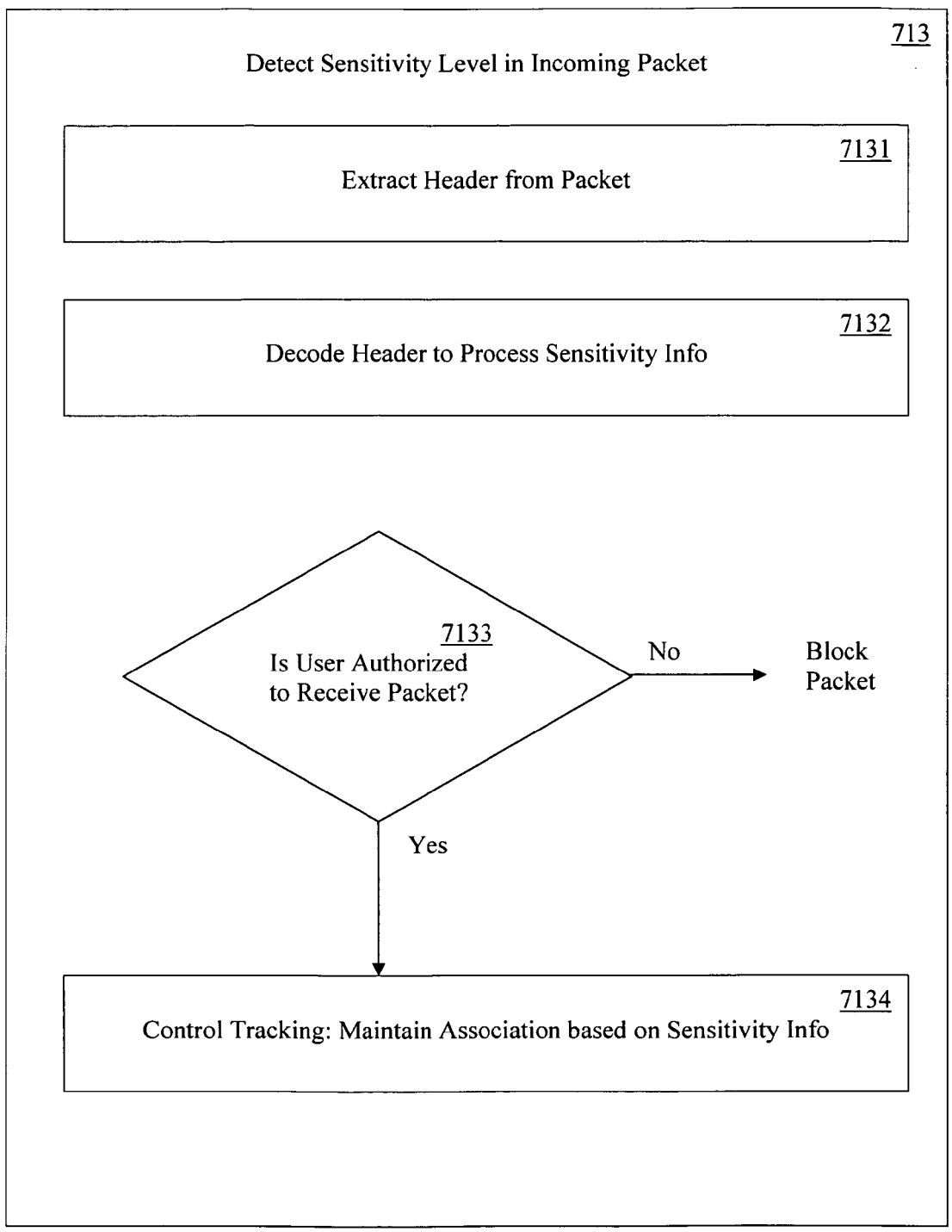
FIG. 12 depicts a flowchart of an exemplary process for detecting sensitivity in incoming packets, according to an embodiment of the present invention.

FIG. 12 depicts a flowchart of an exemplary process for detecting sensitivity in incoming packets (e.g., block 713, above) according to an embodiment of the present invention. In block 7131, the packet header is extracted from the packet. In block 7132, information in the packet header is decoded to process sensitivity information therein. In block 7133, in some embodiments, the header information is examined, to determine if a particular user is authorized to receive the packet. In some such embodiments, if the user is not authorized, the packet is blocked; if the user is authorized, the process continues to block 7134. In block 7134, tracking (e.g., block 72; FIG. 7) is controlled with maintaining an association between the information content associated with the packet (e.g., metadata) and the sensitivity information that is extracted from the packet header and decoded.

Embodiments of the present invention, methods and systems for controlling network content flow, are thus described. While the present invention has been described in particular embodiments, it should be appreciated that the present invention should not be construed as limited by such embodiments, but rather construed according to the following claims.

What is claimed is:

1. A system for controlling a flow of information content in a secure network, said system comprising:
   a tracking module, for storing:
      a sensitivity level of information content; and
      a location of said information content with respect to said system;
      wherein the tracking module is configured to statically track one or more locations of said information content responsive to a user input and dynamically track one or more locations of said information content responsive to reproduction commands or feedback from a discovery agent, or combinations thereof;
   a marking module that receives said sensitivity level from said tracking module upon a call for said information content to be packetized in a packet with a packet header, wherein said packet header is associated with transmission of said information content through a secure network, wherein said marking module appends a sensitivity tag to said packet header associated with said information content in the packet according to said sensitivity level;
   controlling said flow of said information content in the packet in said secure network according to said sensitivity tag; and
   not approving a routing transaction, wherein the routing transaction involves an unauthorized request for the information content or unauthorized sending of the information content to a non-controlled domain or combinations thereof based on the sensitivity tag;
   wherein said flow of said information content is controlled according to said sensitivity tag at Network Layer or Transport Layer.

2. The system as recited in claim 1, wherein said information content is transmitted to a document repository where said sensitivity tag is removed from said information content, and wherein said document repository stores an association of said sensitivity level with said information content while said information content remains in said secure network.

3. The system as recited in claim 1, wherein said tracking module receives said sensitivity level from a discovery agent that discovers said sensitivity level in said information content before said information content is packetized.

4. The system as recited in claim 3, wherein said discovery agent discovers said sensitivity level by:
   crawling through a plurality of pre-existing data;
   searching said plurality of pre-existing data for indicators of sensitivity therein; and
   assigning said sensitivity level based on said indicators.

5. The system as recited in claim 1, wherein said tracking module receives said sensitivity level from a receiving module, wherein said receiving module detects said sensitivity level among incoming packets, wherein said receiving module extracts said sensitivity level from said packet header, and wherein said receiving module informs said tracking module as to said sensitivity level of incoming packets.

6. The system as recited in claim 1, wherein said tracking module receives said sensitivity level from a user interface with which an author thereof classifies said information content according to said sensitivity level.

7. The system as recited in claim 1, wherein said marking module comprises an application program interface for informing an application to perform marking directly and wherein, upon performing said marking, said application calls a network driver to allow said flow of said information content to said secure network.

8. The system as recited in claim 1, further comprising a component that functions with said tracking module and allows management of said information content based on a life cycle characteristic thereof.

9. The system as recited in claim 1, further comprising a system administrator module for promulgating a policy in said secure network that relates to said sensitivity level and said controlling said flow of information content based thereon.

10. The system as recited in claim 1, wherein said information content and said packet header are packetized as a data packet, and wherein said data packet comprises an International Standards Organization's Open Systems Interconnect (OSI) network protocol data packet.

11. A method, comprising:
   identifying information content that is called by a client device prior to packetizing said information content;
   encapsulating, by the client device, the information content in a packet with a packet header, wherein said packet header is added to said information content prior to said information content being transmitted over a controlled network;
   determining a sensitivity level of said information content;
   storing the sensitivity level of said information content;
   storing a location of said information content, wherein an associated tracking module configured to determine the location of the information content is configured to statically track the location of said information content responsive to a user input or dynamically track the location of said information content responsive to reproduction commands or feedback from a discovery agent, or combinations thereof;
   marking a sensitivity tag in said packet header according to said sensitivity level upon said call for said information content, wherein said packet header is marked with said sensitivity tag by said client device and wherein the sensitivity tag comprises data to be used by network devices to route said information content; and
   controlling a flow of said information content through said controlled network according to said sensitivity tag, wherein said flow of said information content is controlled at a Network Layer or a Transport Layer; and
   not approving a routing transaction through the controlled network, wherein the routing transaction is associated with an unauthorized request for the information content or an unauthorized request to send the packet including the information content to a non-controlled domain based on the sensitivity tag;
   wherein said controlling of the flow of said information content is controlled according to said sensitivity tag at Network Layer or Transport Layer.

12. The method as recited in claim 11, further comprising assessing a fee to a user of said controlled network in exchange for said controlling.

13. The method as recited in claim 11, further comprising discovering said sensitivity level in said information content wherein said information content comprises data that is pre-existing on said client device.

14. The method as recited in claim 13, wherein said discovering comprises:
   crawling through a plurality of said pre-existing data;
   searching said plurality of pre-existing data for indicators of sensitivity therein; and
   assigning said sensitivity level based on said indicators.

15. The method as recited in claim 13, wherein said marking comprises said discovering.

16. The method as recited in claim 11, further comprising:
   the storing the location of said information content, wherein said information content is stored as metadata;
   maintaining an association between said sensitivity level and said metadata;
   extracting said header;
   decoding said header and processing said sensitivity information therein; and
   controlling said tracking according to said processing sensitivity information wherein said maintaining an association is performed according to said sensitivity information.

17. The method as recited in claim 11, wherein said packet header comprises an OSI packet header, and wherein said information content and said packet header are combined as an OSI data packet.

18. A non-transitory computer readable medium that contains encoded thereon computer usable code that causes a computer system to perform a process comprising:
   identifying a call for information content, wherein said information content is packetized, in a packet to include a packet header associated with transmission of said information content through a controlled network;
   determining a sensitivity level of said information content;
   tracking said information content, wherein said tracking comprises:
      storing the sensitivity level of said information content;
      at least one of statically tracking one or more locations of said information content responsive to a user input or dynamically tracking one or more locations of said information content responsive to reproduction commands or feedback from a discovery agent, or combinations thereof;
      storing location information of said information content, wherein said information content is stored at a location identified by said location information as metadata;
      maintaining an association between said sensitivity level and said metadata;
   marking a sensitivity tag in said packet header associated with said information content according to said sensitivity level; and routing said information content in said controlled network according to said sensitivity tag;
not approving a routing transaction including an unauthorized request for the information content in the packet or an unauthorized request to send the packet including the information content to a non-controlled domain or combinations thereof based on the sensitivity tag;
wherein said routing of said information content is controlled according to said sensitivity tag at Network Layer or Transport Layer.

19. The non-transitory computer readable medium as recited in claim 18, wherein said process further comprises:
discovering said sensitivity level in said information content wherein said information content comprises pre-existing data.

20. The non-transitory computer readable medium as recited in claim 19, wherein said discovering comprises:
crawling through a plurality of said pre-existing data;
searching said plurality of said pre-existing data for indicators of sensitivity therein; and
assigning said sensitivity level based on said indicators.

21. The non-transitory computer readable medium as recited in claim 18, wherein said process further comprises:
detecting said sensitivity level among incoming packets wherein said incoming packets comprise a header and content and wherein said header comprises information relating to said sensitivity of said content;
extracting said header from said incoming packets;
decoding said header;
processing said sensitivity information in the header; and
controlling said tracking according to said processing said sensitivity information wherein said maintaining an association is performed according to said sensitivity information.

22. The non-transitory computer readable medium as recited in claim 18, wherein said packet header comprises an International Standards Organization's Open Systems Interconnect (OSI) packet header.

23. The non-transitory computer readable medium as recited in claim 18, wherein said sensitivity tag comprises an International Standards Organization's Open Systems Interconnect (OSI) tag corresponding to Transport Layer 4 of an OSI Standard.

24. A system comprising:
means for determining a sensitivity level of information content identified for transmission in a controlled network;
means for tracking said information content;
means for statically tracking one or more locations of said information content responsive to a user input and dynamically tracking one or more locations of said information content responsive to reproduction commands or feedback from a discovery agent, or combinations thereof;
means for storing location information of said information content, wherein said information content is stored at a location identified by said location information as metadata;
means for maintaining an association between said sensitivity level and said metadata;
means for marking a sensitivity tag in a packet header associated with said information content according to said sensitivity level wherein said sensitivity tag includes data to be used for routing a flow of said information content in said controlled network at a Network Layer or a Transport Layer of an OSI network protocol;
means for not approving a routing transaction if the routing transaction is associated with an unauthorized request for the information content or is associated with an unauthorized request to send the information content to a non-controlled domain, wherein the not approving is based on the sensitivity.

* * * * *